United States Patent [19]
Aldous

[11] Patent Number: 4,754,517
[45] Date of Patent: Jul. 5, 1988

[54] WINDSHIELD WIPER BLADE

[76] Inventor: Glenn R. Aldous, 5483 Blackrock Rd., Pocatello, Id. 83204

[21] Appl. No.: 50,737

[22] Filed: May 15, 1987

[51] Int. Cl.⁴ .......................... B60S 1/28; B60S 1/38; B60S 1/46
[52] U.S. Cl. .............................. 15/250.04; 15/250.03; 15/250.36; 15/250.4; 15/250.41
[58] Field of Search .......... 15/250.01, 250.03, 250.04, 15/250.07, 250.08, 250.09, 250.1, 250.2, 250.36, 250.4, 250.41, 250.42

[56] References Cited

U.S. PATENT DOCUMENTS

| | | | |
|---|---|---|---|
| 3,548,441 | 12/1970 | Kruger | 15/250.1 X |
| 3,871,049 | 3/1975 | Workman | 15/250.04 |
| 4,060,872 | 12/1977 | Bucklitzsch | 15/250.04 |
| 4,327,457 | 5/1982 | Lunsford | 15/250.03 |

FOREIGN PATENT DOCUMENTS 8001155  6/1980  World Int. Prop. O. ....... 15/250.36

*Primary Examiner*—Peter Feldman
*Attorney, Agent, or Firm*—Hopkins, French, Crockett, Springer & Hoopes

[57] ABSTRACT

An improved windshield wiper assembly comprising at least one first wiping means, in the form of a rubber wiper blade, a second wiping means in the form of a scrubbing or scouring pad and a deformable bladder therebetween. The bladder can be engorged with windshield washer fluid, which causes the scrubbing pad to deform outwardly, or toward the windshield to be cleaned. As washer fluid leaks from the bladder through perforations and into the scrubbing pad, the windshield wiper is activated in a to-and-fro motion so that the scrubbing pad means scrubs dried insect debris from the windshield.

20 Claims, 1 Drawing Sheet

WINDSHIELD WIPER BLADE

BACKGROUND OF THE INVENTION

This invention relates to windshield wipers, and more particularly, to an improved windshield wiper assembly capable of removing dried insect debris from a windshield.

All automobiles and trucks are equipped with windshields or wind screens which require periodic cleaning while the vehicle is under way. Therefore, all such vehicles are likewise equipped with windshield wipers which are adapted to move in a back-and-forth or to-and-fro motion in order to sweep across a major portion of the windshield and remove water therefrom. Conventional windshield wipers are adapted to function in a "squeegee" manner—that is, the rubber windshield wiper blades scrape across the windshield surface and remove water therefrom. Most automobiles and trucks produced after the early 1970's are also provided with windshield washer fluid delivery systems, wherein cleaning fluid may be delivered to the windshield to aid the windshield wipers in removing dirt or dust therefrom. Windshield wipers have been designed so that they bear against the windshield with a moderate amount of force—enough to sweep the surface of the windshield clean, but generally not enough to effect any scrubbing action by the wiper blade, since the purpose of the wiper blade is to remove water.

The problem that has existed for some time is that when flying or airborne insects impact against the windshield of a rapidly moving automobile or truck, the body fluids of the insect, and to some degree the exterior body parts, adhere to the windshield and are quickly dried thereon. The resulting windshield smear is, for the most part, impossible to remove by the squeegee action of a conventional windshield wiper blade, even when assisted with windshield washing fluid. A number of modifications to conventional windshield wipers have been proposed in the past to solve this problem, most of which deal with the problem by increasing the amount of pressure applied to the windshield by the windshield wiper. For instance, U.S. Pat. No. 3,089,175 proposes to remove the conventional linkage assembly between the removable wiper blade and the blade carrier, and replace it with a plurality of magnets spaced along the length of the wiper blade in order to exert uniform pressure against the windshield to be cleaned. U.S. Pat. No. 3,058,141 proposes to increase the pressure between the wiper blade and the windshield as engine speed increases, so as to reduce the problem of wind-lift of the wiper blades. Compressed air is used in order to apply greater pressure to the windshield, and a light spring is used to maintain sufficient contact between the wiper blade and the windshield even when the wiper motor is inoperative.

Likewise, U.S. Pat. No. 3,685,086 discloses an attachment for windshield wipers which clamps onto a wiper arm and comprises a plurality of transverse wind-catching ribs progressively increasing in height from a narrow end to a wide end of the unit. The ribs utilize the force of wind impacting against the windshield when the car is moving to increase the pressure of the windshield wiper against the windshield.

Various foreign patents have been issued directed toward the same result, including Japanese Pat. No. 58-9365 (A) and West German Offenlegungsschrifts Nos. 1,505,430 and 1,938,618.

Finally, U.S. Pat. No. 3,939,524 discloses a wiper blade assembly wherein a wiper blade is provided with a pair of squeegee lips in an inverted U-shape, with brush material disposed therebetween. A windshield washer fluid cavity is located above the brush material in order to distribute the fluid along the entire length of the wiper blade. This is an attempt to deal with the problem noted above, wherein the brushes assist the wiper blade in removing debris from the windshield.

While all of these devices may provide some benefit over that of a conventional windshield wiper/washer, the problem of removing the dried bug debris still remains—none of these devices provides the proper "scrubbing" action necessary to remove such material. Therefore, it is an object of the present invention to provide a windshield wiper assembly capable of removing dried bug debris through the proper combination of scrubbing, fluid application and squeegee action.

BRIEF DESCRIPTION OF THE DRAWINGS

The invention will be further described with reference to the accompanying drawings, which show by way of example a preferred embodiment of the invention, in which.

SUMMARY OF THE INVENTION

To accomplish the object of this invention, there is proposed according to one aspect of the invention a windshield wiper assembly comprising a wiper arm affixed to a motor which induces back-and-forth movement of the wiper arm, and an elongate carrier for a wiper blade, the carrier being affixed to the wiper arm. The wiper blade comprises at least one first wiping means, in the nature of a squeegee, which is adapted to remove aqueous fluids from a windshield. The wiper blade further comprises a second wiping means, in the nature of a scrubbing or scouring pad, which is adapted to remove particulates and non-aqueous fluids from a windshield. Such particulates and non-aqueous fluids conventionally comprise dried insect body fluids and body arts, oil and grease, and various other road debris. A bladder means is provided to deform the second wiping means outwardly from a first position wherein it does not contact the windshield to a second position wherein the scrubbing may take place.

In a preferred embodiment, the first wiping means is provided as a pair of wiping blades with the bladder and second wiping means disposed therebetween. The bladder is interconnected to a windshield washer fluid delivery system, such that when the bladder is fully engorged with fluid, perforations in the bladder walls permit fluid to travel from the bladder to the second wiping means to assist in removing insect debris from a windshield. The bladder may be provided as a single envelope, or it may be provided as an outer envelope within which is contained an inner envelope. In this embodiment, the inner envelope is inter-connected with the windshield washer fluid delivery system, and is provided with perforation such that the fluid travels from the inner envelope into outer envelope and thence into the second wiping means.

DETAILED DESCRIPTION OF THE INVENTION

Figure 1:
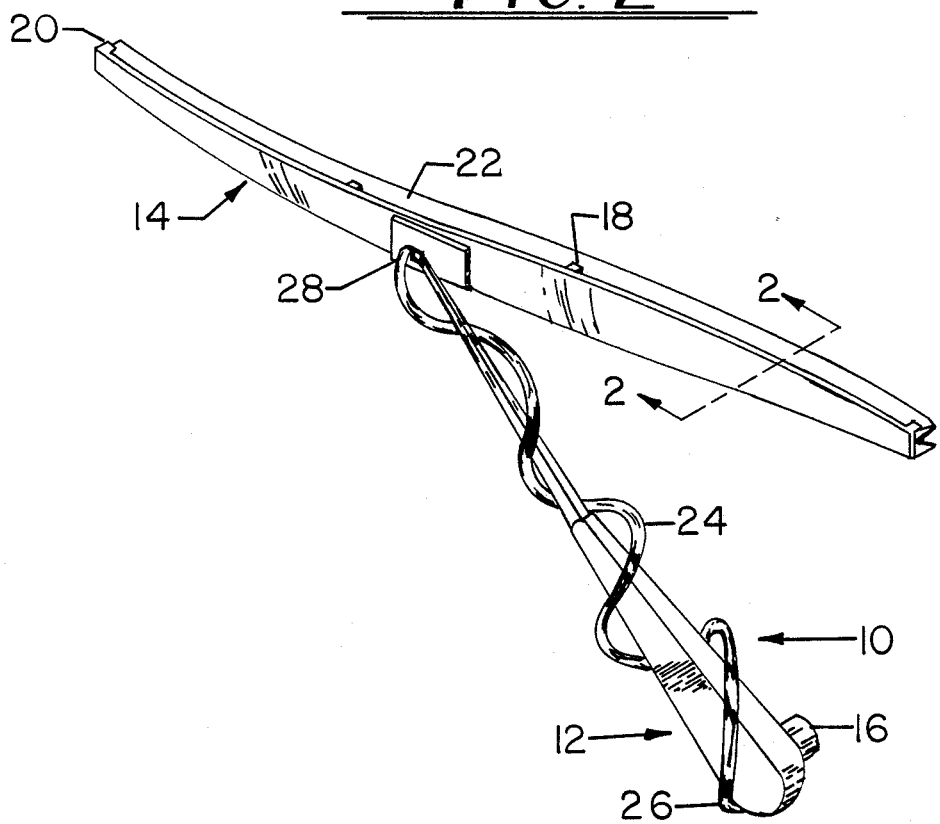
FIG. 1 is a perspective view of a representative embodiment of the present invention.

FIG. 1 represents a conventional windshield wiper assembly, generally designated (10), as may be found on an American model automobile. It is to be understood that any reference to a windshield wiper assembly herein is equally applicable, with various modifications obvious to one of ordinary skill in the art, for use on any other moving vehicle with a windshield, such as a semi-trailer tractor, trains, airplanes, etc. The assembly (10) comprises a wiper arm (12) and an elongate carrier (14). The arm (12) is affixed to a post (not shown) as at (16). A motor (also not shown) turns the post and effects the back-and-forth or to-and-fro movement of the wiper assembly across the windshield. The carrier (14) includes ears, (18) and (20), which interact with a removable elongate wiper blade (22) to securely hold the blade in place.

Of course, while the present invention will be described with reference to a removable and replaceable wiper blade (22), this invention is equally susceptible to being provided as an entirely replaceable wiper assembly (10).

A windshield washer fluid delivery conduit (24) is shown in FIG. 1 external of wiper arm (12). The conduit (24) could likewise be provided within wiper arm (12). One end (26) of conduit (24) is affixed to a windshield washer fluid reservoir and the other end (28) is affixed to wiper blade (22). The fluid reservoir provides washer fluid to the wiper assembly under pressure, which in most American cars will be between 5 and 10 psi.

Figure 2:
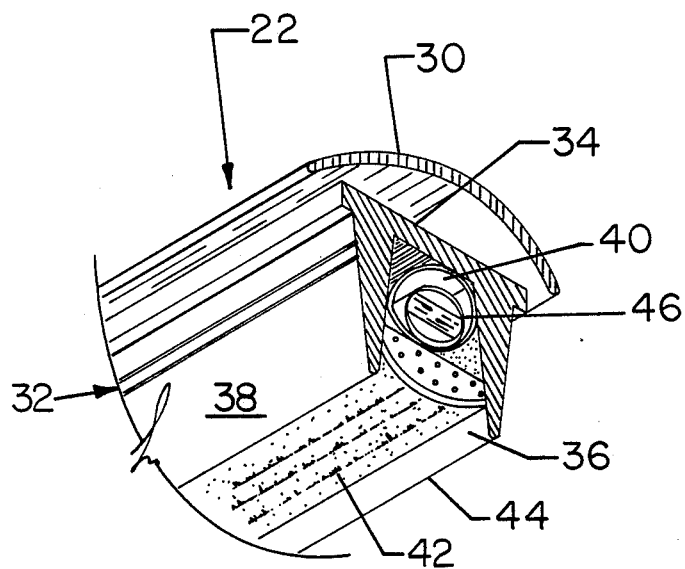
FIG. 2 is a partial sectional view taken along line 2—2 of FIG. 1.

The wiper blade (22) may be seen in more detail in FIG. 2. The wiper blade is provided with a rigid retaining means (30) which interfits with ears (18, 20) of carrier (14) in order to securely hold a removable wiper blade in place. The retaining means may be made of any suitable rigid material, such as aluminum, plastic, etc. A first wiping means, indicated generally at 32, comprises a transverse portion (34) and a pair of lip members (36, 38) affixed thereto. The lip members (36, 38) effect a "squeegee" action when disposed against a windshield to effectively remove aqueous films from the windshield.

It is to be understood that while the first wiping means is represented figuratively herein with a pair of lip members, this device will function effectively with a single lip member. However, as explained more fully hereinafter, it is believed that the most effective cleaning of a windshield will occur with a pair of such members. Disposed between the lip members (36, 38) is a bladder member 40 and a second wiping means (42). The bladder 40 is interconnected with conduit 24 such that windshield washer fluid is delivered directly to the conduit (40). When a windshield washer fluid delivery system is activated by a driver, the conduit (24) and bladder (40) are filled with and thereby pressurized by the fluid. Upon being pressurized, the conduit (40) expands to its fully-engorged condition, which is greater than the effective volume of the space defined by the transverse portion (34) and lip members (36, 38) of the first wiping means and the second wiping means (42). Therefore, further expansion of the bladder (40) from its flaccid or inoperative first position to its extended position causes the second wiping means (42) to be "pushed" outwardly beyond the edge (44) of lips (36, 38) and into contact with the windshield.

Of course, the perforations in the bladder must be properly sized so that they do not permit the passage of sufficient windshield washer fluid there through and into the second wiping means (42) to cause deflation of the bladder (40). The combination of the fluid pressure and perforation size must be such that the bladder 40 remains fully extended, thereby maintaining the second wiping means in a deformed condition against the windshield, while at the same time providing sufficient windshield washer fluid to the second wiping means to effect adequate cleaning of the windshield.

As long as the windshield washer fluid delivery system is maintained in an "on" position, the bladder 40 will remain extended and the second wiping means (42) will remain in contact with the windshield. Therefore, when the windshield wiper assembly reciprocates back-and-forth the second wiping means (42) will bear against the windshield and aid in removing dried insect debris therefrom.

While the first wiping means is provided as a conventional rubber wiper blade, the second wiping means (42) is advantageously provided in a form such that it can scrub the windshield surface. For example, loosely nonwoven meltblown polyproplene pads, such as are conventionally used to clean household dishes, may be used. Likewise, sponge-like members with imbedded "grit" may perform satisfactorily.

Because cleaning fluid is being applied as the wiper assembly sweeps across the windshield, it is believed that in the interest of safety a wiper blade having a squeegee-action cleaning member on each side of the second wiping means is desirable. Otherwise, a film of windshield washer fluid would be left on the windshield on every other back-and-forth stroke until removed by the return stroke, thereby creating a potential driving hazard. With the wiper blade as shown in the FIG. 2, the fluid is removed as it is applied, resulting in no impaired visibility for the driver.

In an alternative embodiment, the bladder (40) may be provided as an outer envelope surrounding an inner envelope (46) of tubular design. In this embodiment, the inner envelope (46) would be inter-connected with conduit (24) at (28). When the fluid delivery system is activated, fluid would flow into the inner envelope (46), thence through perforations therein into the "outer envelope" (40). In either embodiment, the bladder member (40) must contain perforations to permit windshield washer fluid to flow from the bladder (40) into the second wiping means (42).

When the present invention is used in environments requiring heavy-duty cleaning, either because of increase surface area or more frequent use, the wiper blade (22) can be provided in multiples. Likewise, in heavy duty environments, enlargement of the bladder (40) can be increased by assisting with compressed air, as is commonly available in tractor trailer combinations. Such air compression would provide greater bladder expansion, thereby greater deformation of the second wiping means and greater scrubbing action on the windshield.

Various modifications and adjustments may be made in the invention disclosed herein without departing from the spirit and scope of the invention. Therefore, the scope of this invention is to be determined solely by the claims appended hereto.

I claim:

1. An improved windshield wiper assembly comprising:

a. a wiper arm affixed to motor means such that the wiper arm is directed in a back-and-forth motion across a windshield;
b. an elongate carrier for a wiper blade affixed to said wiper arm;
c. a windshield washer fluid delivery system which delivers windshield washer fluid to said wiper blade; and
d. said elongate wiper blade comprising:
   (1) at least one first wiping means adapted to remove aqueous fluids from a windshield;
   (2) a second wiping means adapted to remove particulates and non-aqueous fluids from a windshield by abrasion; and
   (3) bladder means adapted to deform the second wiping means from a first resting position to a second operative position.

2. The assembly as recited in claim 1, wherein said wiper blade comprises a pair of spaced apart first wiping means.

3. The assembly as recited in claim 1, wherein said second wiping means comprises a deformable abrasive pad.

4. The assembly as recited in claim 1, wherein said bladder means comprises an elongate, deformable fluid-filled member in contact with said second wiping means.

5. The assembly as recited in claim 4, wherein said bladder means is deformable between a first inoperative position and a second extended operative position.

6. The assembly as recited in claim 5, wherein when said bladder means is in said second extended operative position, the second wiping means is deformed to a second operative position in contact with said windshield.

7. The assembly as recited in claim 6, wherein when said bladder means and said second wiping means are in the second operative position, windshield washer fluid is directed from said bladder means to said second wiping means.

8. The assembly as recited in claim 7, wherein said bladder means is provided with perforations enabling said bladder means to remain in said second operative position while windshield washer fluid is directed therefrom to said second wiping means.

9. The assembly as recited in claim 1, wherein said bladder means comprises an outer envelope and an inner envelope.

10. The assembly as recited in claim 9, wherein said outer and inner envelopes are perforated such that windshield washer fluid is delivered to said inner envelope, and thence to said outer envelope, and thence to said second wiping means.

11. The assembly as recited in claim 10, wherein the pressure of said windshield washer fluid causes said second wiping means to be deformed against said windshield.

12. An improved windshield wiper assembly comprising a wiper arm, an elongate carrier for a removable wiper blade, and a windshield washer fluid delivery system for delivery of fluid to said windshield, the improvement in said removable wiper blade comprising:
   a. at least one first wiping means adapted to remove aqueous fluids from a windshield;
   b. a second wiping means adapted to remove particulates and non-aqueous fluids from a windshield by abrasion; and
   c. bladder means adapted to deform the second wiping means from a first inoperative position to a second operative position in contact with said windshield.

13. The assembly as recited in claim 12, wherein said removable wiper blade comprises a pair of first wiping means.

14. The assembly as recited in claim 13, wherein said second wiping means and said bladder means are disposed between said pair of first wiping means.

15. The assembly as recited in claim 12, wherein said bladder means comprises an elongate, deformable fluid-filled member in contact with said second wiping means.

16. The assembly as recited in claim 15, wherein said bladder means is deformable between a first inoperative position and a second extended operative position.

17. The assembly as recited in claim 16, wherein when said bladder means is in said second extended operative position, the second wiping means is deformed to a second position in contact with said windshield.

18. The assembly as recited in claim 12, wherein said bladder means comprises an outer envelope and an inner envelope.

19. The assembly as recited in claim 18, wherein said outer and inner envelopes are perforated such that windshield washer fluid is delivered to said inner envelope, and thence to said outer envelope, and thence to said second wiping means.

20. The assembly as recited in claim 12, wherein the bladder means is provided with perforations enabling said bladder means to remain in said second operative position while windshield washer fluid is directed to said second wiping means.

* * * * *